(12) United States Patent
Jeong et al.

(10) Patent No.: US 9,799,859 B2
(45) Date of Patent: Oct. 24, 2017

(54) SECONDARY BATTERY HAVING IMPROVED SAFETY

(75) Inventors: Chang Moon Jeong, Cheongju-si (KR); Chang Ho Kim, Daejeon (KR); Seung Don Choi, Daejeon (KR); Min Chul Jang, Daejeon (KR); Seung Taek Hong, Seoul (KR); In Cheol Shin, Daejeon (KR); Nan Ji Yun, Daejeon (KR); Dal Mo Kang, Daejeon (KR); Yo Jin Kim, Daejeon (KR); Yong Kyu Ju, Daejeon (KR); You Rim Yoon, Daejeon (KR); Sang Yoon Jeong, Daejeon (KR); Seung Su Cho, Daejeon (KR); Soul Gie Hong, Seoul (KR); Jun Seok Choi, Daejeon (KR)

(73) Assignee: LG CHEM, LTD., Seoul (KR)

(*) Notice: Subject to any disclaimer, the term of this patent is extended or adjusted under 35 U.S.C. 154(b) by 55 days.

(21) Appl. No.: 13/343,018

(22) Filed: Jan. 4, 2012

(65) Prior Publication Data

US 2012/0114990 A1  May 10, 2012

Related U.S. Application Data

(63) Continuation of application No. PCT/KR2011/007712, filed on Oct. 17, 2011.

(30) Foreign Application Priority Data

Nov. 5, 2010 (KR) .......... 10-2010-0109973
Apr. 14, 2011 (KR) .......... 10-2011-0034680
Jun. 22, 2011 (KR) .......... 10-2011-0060561

(51) Int. Cl.
*H01M 2/10* (2006.01)
*H01M 2/32* (2006.01)
(Continued)

(52) U.S. Cl.
CPC .......... *H01M 2/0257* (2013.01); *C08G 73/22* (2013.01); *C08L 77/10* (2013.01); *C08L 79/04* (2013.01);
(Continued)

(58) Field of Classification Search
CPC ...... H01M 2/0257; H01M 2/32; H01M 2/345; H01M 2/347; H01M 2/1077; H01M 2/1094
(Continued)

(56) References Cited

U.S. PATENT DOCUMENTS 5,510,211 A * 4/1996 Sundberg et al. ............ 429/210
5,641,933 A  6/1997 Kim et al.
(Continued)

FOREIGN PATENT DOCUMENTS

JP  9-18041 A  1/1997
JP  H10-159854 A  6/1998
(Continued)

OTHER PUBLICATIONS

Derwent Abstract of KR 10-0876277.*
(Continued)

*Primary Examiner* — Ula C Ruddock
*Assistant Examiner* — Frank Chernow
(74) *Attorney, Agent, or Firm* — Birch, Stewart, Kolasch & Birch, LLP

(57) ABSTRACT

Provided are a secondary battery, a battery module, and a battery pack, which have improved safety. Particularly, since a bulletproof material is disposed on the inside and/or the outside of an exterior part, even when a conductive needle-shaped member penetrates a secondary battery, heating, burning, discharge of evaporated electrolyte, and electrical contact between the needle-shaped member and an electrode
(Continued)

can be prevented, thereby improving safety of the secondary battery, the battery module, and the battery pack.

2 Claims, 4 Drawing Sheets

(51) Int. Cl.
| | | |
|---|---|---|
| *H01M 2/02* | (2006.01) | |
| *H01M 2/34* | (2006.01) | |
| *C08G 73/22* | (2006.01) | |
| *C08L 77/10* | (2006.01) | |
| *C08L 79/04* | (2006.01) | |

(52) U.S. Cl.
CPC ....... *H01M 2/1077* (2013.01); *H01M 2/1094* (2013.01); *H01M 2/32* (2013.01); *H01M 2/345* (2013.01); *H01M 2/347* (2013.01); *H01M 2/348* (2013.01); *H01M 2/028* (2013.01); *H01M 2/0262* (2013.01); *H01M 2220/20* (2013.01)

(58) Field of Classification Search
USPC .................. 429/72, 163, 158, 156, 120
See application file for complete search history.

(56) References Cited

U.S. PATENT DOCUMENTS

| | | | |
|---|---|---|---|
| 6,245,461 B1 | 6/2001 | Smith et al. | |
| 2006/0057456 A1 | 3/2006 | Hong et al. | |
| 2007/0178369 A1* | 8/2007 | Conrardy | H01M 2/1077 429/100 |
| 2008/0160397 A1* | 7/2008 | Singleton | H01M 2/1066 429/100 |
| 2009/0176147 A1* | 7/2009 | Hatanaka et al. | 429/94 |
| 2009/0186270 A1 | 7/2009 | Harada et al. | |
| 2010/0119931 A1* | 5/2010 | Shishido et al. | 429/153 |
| 2010/0190081 A1* | 7/2010 | Park et al. | 429/452 |
| 2012/0107674 A1* | 5/2012 | Nishino et al. | 429/163 |

FOREIGN PATENT DOCUMENTS

| | | |
|---|---|---|
| JP | H 10172611 A | 6/1998 |
| JP | 2010-015931 A | 1/2010 |
| JP | 2012-084447 A | 4/2012 |
| KR | 10-0255413 B1 | 5/2000 |
| KR | 2005-116374 A | 4/2005 |
| KR | 2005-123127 A | 5/2005 |
| KR | 2005-129260 A | 5/2005 |
| KR | 10-0561297 B1 | 3/2006 |
| KR | 2008-269954 A | 11/2008 |
| KR | 10-0878277 B1 | 12/2008 |
| KR | 10 20090024410 A | 3/2009 |
| KR | 10-0942985 B1 | 2/2010 |
| KR | 2 177 864 A2 | 4/2010 |
| KR | 2010-080370 A | 4/2010 |
| KR | 2010-097700 A | 4/2010 |
| KR | 10-2010-0099538 A | 9/2010 |
| KR | 2 177 864 A3 | 8/2013 |
| WO | WO 2009/048952 A1 | 4/2009 |

OTHER PUBLICATIONS

English Translation of KR 10-20070077097.*
KIPO International Search Report for Application No. PCT/KR2011/007712 dated Apr. 27, 2012.
Extended European Search Report issued in European Patent Application No. 11838163.1 dated Oct. 9, 2013.

* cited by examiner

SECONDARY BATTERY HAVING IMPROVED SAFETY

CROSS-REFERENCE TO RELATED APPLICATIONS

This application is a continuation of PCT International Application No. PCT/KR2011/007712 filed on Oct. 17, 2011, which claims priority of Korean Patent Application No. 10-2010-0109973 filed in Republic of Korea on Nov. 5, 2010, Korean Patent Application No. 10-2011-0034680 filed in Republic of Korea on Apr. 14, 2011 and Korean Patent Application No. 10-2011-0060561 filed in Republic of Korea on Jun. 22, 2011, the entire contents of which are incorporated herein by reference.

BACKGROUND OF THE INVENTION

The present invention disclosed herein relates to a secondary battery, a battery module, and a battery pack, which have improved safety.

Secondary batteries, which are rechargeable, are widely used as an energy source of wireless mobile devices. In addition, secondary batteries are regarded with much interest as a power source for electric vehicles (EVs) and hybrid electric vehicles (HEVs), which are expected to reduce a it pollution caused by typical gasoline and diesel vehicles using fossil fuels.

One to four battery cells are used in a small mobile device, whereas a medium-to-large battery module including a number of battery cells electrically connected to one another is used in a medium-to-large device such as an automobile requiring high power and high capacity. To optimally reduce the size and weight of medium-to-large battery modules, prismatic-type batteries and pouch-type batteries, which have high integration and small weight-to-capacity ratio, are widely used as battery cells in medium-to-large battery modules.

Particularly, since pouch-type batteries including an exterior part such as an aluminum laminate sheet are light weight, economically manufactured, and easily transformed, they attract a lot of attention.

Medium-to-large battery modules include a number of battery cells electrically connected to one another in series to provide power and capacity needed by a certain apparatus or device, and have a stable structure against external force.

Battery cells constituting a medium-to-large battery module are rechargeable secondary batteries. Of these, lithium secondary batteries have high energy density, high voltage, long service life, and low self discharge rate.

One of main efforts for developing secondary batteries is to improve safety. Particularly, since secondary batteries, used in a medium-to-large battery pack as a power source of electric vehicles and hybrid vehicles, include a number of highly integrated high energy battery cells, and contain organic electrolyte having a low ignition point, it is important to ensure their safety.

SUMMARY OF THE INVENTION

The present invention provides a secondary battery, a battery module, and a battery pack, which include a bulletproof material to improve their safety.

Embodiments of the present invention provide secondary batteries including at least one bulletproof material.

In some embodiments, any bulletproof material in the art may be used provided that the bulletproof material has a tensile strength ranging from about 1.0 GPa to about 6.0 GPa, and a pyrolysis temperature of about 150° C. or higher. Examples of the bulletproof material may include aramid fiber, glass fiber, ultra-high-molecular-weight polyethylene fiber (UHMWPE fiber), and polybenzoxazole fiber (PBO fiber), but are not limited thereto.

In other embodiments, the bulletproof material may be disposed on any region of the secondary battery such as an outer surface of an electrode assembly, an inner surface of a battery exterior part, and an outermost surface of the battery exterior part.

In other embodiments of the present invention, battery modules include: a plurality of secondary batteries connected in series or in parallel to each other; and at least one of the bulletproof materials.

In some embodiments, the bulletproof material may be formed of the above-described material.

In other embodiments, the battery modules may be provided in the following forms: i) the bulletproof material is not provided to the secondary batteries included in the battery module, but is provided at the level of the battery module; ii) the bulletproof material is provided to the secondary batteries included in the battery module, but is not provided at the level of the battery module; and iii) the bulletproof material is provided to the secondary batteries included in the battery module, and is also provided at the level of the battery module.

In even other embodiments, the bulletproof material at the level of the battery module may be disposed on at least one of an inside of the battery module, an inner surface of a battery module exterior part, and an outermost surface of the battery module exterior part.

In still other embodiments of the present invention, battery packs include: a plurality of battery modules, and at least one of the bulletproof materials to improve safety.

In some embodiments, the battery packs may be provided in the following forms: i) the bulletproof material is not provided to the battery modules included in the battery pack, but is provided at the level of the battery pack; ii) the bulletproof material is provided to the battery modules included in the battery pack, but is not provided at the level of the battery pack; and iii) the bulletproof material is provided to the battery modules included in the battery pack, and is also provided at the level of the battery pack.

In other embodiments, the bulletproof material at the level of the battery pack may be disposed on at least one of an inside of the battery pack, an inner surface of a battery pack exterior part, and an outermost surface of the battery pack exterior part.

In even other embodiments, the battery packs may be used as a power source for power tools; electric vehicles (EVs) including a hybrid electric vehicle (REV) and a plug-in hybrid electric vehicle (PHEV); electric two-wheeled vehicles including an E-bike and an E-scooter; electric golf carts; electric trucks; and electric commercial vehicles.

In yet other embodiments, when being disposed in the engine room of the electric vehicle, the battery pack may be adjacent to a duct through which refrigerant flows, and the battery pack or the duct may be provided with the bulletproof material.

In further embodiments, the bulletproof material may be disposed between the battery pack and the duct, or the duct may be disposed between the battery pack and the bulletproof material, but is not limited thereto.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

A secondary battery according to the present invention includes at least one bulletproof material.

For example, the bulletproof material may have a tensile strength ranging from about 1.0 GPa to about 6.0 GPa, and be thermally decomposed at a temperature of about 150° C. or higher.

The bulletproof material protects a secondary battery from an external shock. Even when a conductive needle-shaped member damages a secondary battery, the bulletproof material protects an electrode assembly disposed in the secondary battery.

Figure 1:
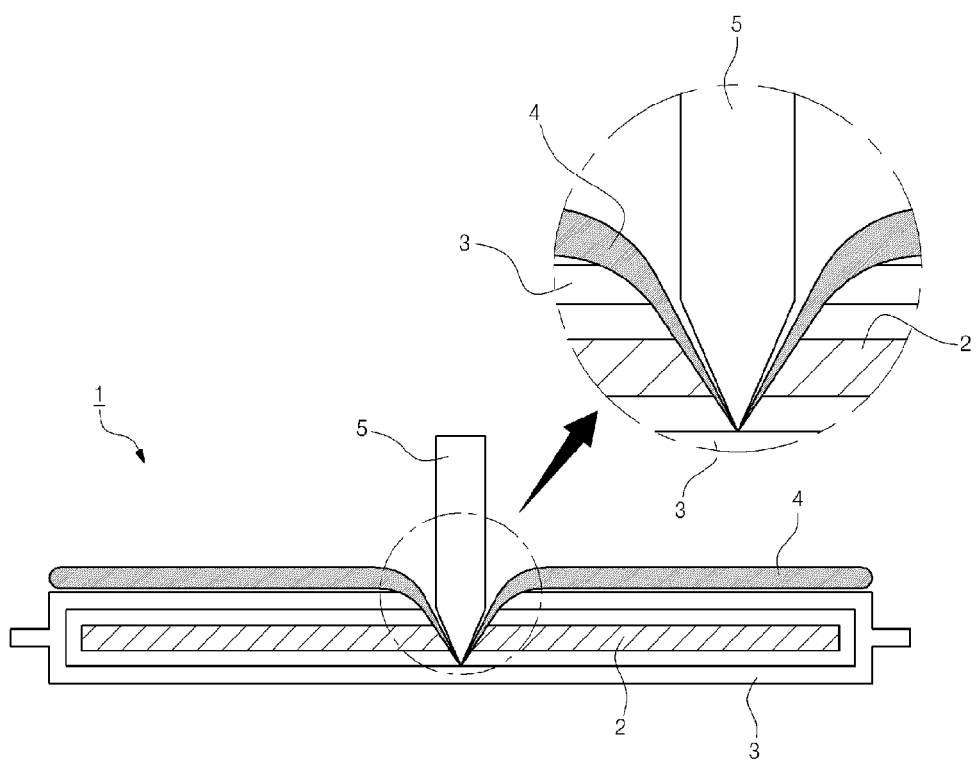
FIG. 1 is a schematic view illustrating a state in which a conductive needle-shaped member penetrates a secondary battery, according to an embodiment of the present invention.

Referring to FIG. 1, even when a conductive needle-shaped member 5 penetrates a secondary battery 1, a bulletproof material 4, which also penetrates the secondary battery 1, wraps the needle-shaped member 5. Thus, the bulletproof material 4 contacts an electrode assembly 2 to prevent heating, burning, and short-circuiting. In addition, the bulletproof material 4 penetrating together with the needle-shaped member 5 prevents spark and excessive discharge of electrolyte evaporated by temperature increase due to a local short circuit, thereby decreasing the possibility of burning.

However, when such a bulletproof material has a tensile strength less than about 1.0 GPa, the bulletproof material may be ruptured by a conductive needle-shaped member, and an electrode assembly may contact the needle-shaped member, thereby causing heating, burning, and short-circuiting. In addition, when the bulletproof material has a tensile strength greater than about 6.0 GPa, flexibility of the bulletproof material is degraded, and thus, the bulletproof material may not wrap the needle-shaped member. Accordingly, the needle-shaped member may contact the electrode assembly.

When the bulletproof material is thermally decomposed at a temperature lower than about 150° C., the battery may operate abnormally, or the bulletproof material may be thermally decomposed by quick temperature increase due to an external shock, and thus, may not protect the battery. Furthermore, the bulletproof material may cause an incident reaction of the battery.

To address these limitations, a bulletproof material may have a tensile strength ranging from about 2.0 GPa to about 6.0 GPa, preferably from about 3.0 GPa to about 6.0 GPa, and have a pyrolysis temperature of about 200° C. or higher, preferably, about 350° C. or higher.

Since a bulletproof material provided to a secondary battery according to the present invention is superior to a polymer resin in tensile strength, heat resistance, and insulating performance, damage such as heating, burning, and short-circuiting due to a conductive needle-shaped member can be prevented.

Any bulletproof material in the art may be used provided that the bulletproof material has a tensile strength ranging from about 1.0 GPa to about 6.0 GPa, and a pyrolysis temperature of about 150° C. or higher.

Examples of the bulletproof material may include aramid fiber, glass fiber, ultra-high-molecular-weight polyethylene fiber (UHMWPE fiber), and polybenzoxazole fiber (PBO fiber), but are not limited thereto. In more detail, examples of the aramid fiber may include Kevlar, Twaron, Heracron, and Technora; examples of the UHMWPE fiber may include Dyneema and Spectra; and examples of the PBO fiber may include Zylon.

Referring again to FIG. 1, the secondary battery 1 includes the bulletproof material 4 at the inside and/or the outside of a battery exterior part 3, but the position of the bulletproof material 4 is not limited thereto. For example, the bulletproof material 4 may be disposed on at least one of an outer surface of the electrode assembly 2, an inner surface of the battery exterior part 3, and the outermost surface of the battery exterior part 3.

When the bulletproof material 4 is disposed on the outermost surface of the battery exterior part 3, the battery exterior part 3 can be protected from an external shock. Also, in this case, even when the needle-shaped member 5 penetrates the secondary battery 1, the electrode assembly 2 can be insulated from the needle-shaped member 5.

In more detail, the bulletproof material 4 may wrap at least one portion of four surfaces of the electrode assembly 2, or the bulletproof material 4 may be disposed on at least one portion of the greatest surface of the electrode assembly 2.

When the bulletproof material 4 is disposed at the outside of the battery exterior part 3, the bulletproof material 4 may wrap at least one portion of the battery exterior part 3. For example, the bulletproof material 4 may be disposed on a great surface of the battery exterior part 3, as illustrated in FIG. 1, thereby efficiently protecting the secondary battery 1.

The bulletproof material 4 may be provided in plurality in the secondary battery 1, and the number thereof may vary with the weight and the volume of the bulletproof materials 4 according to a purpose and a capacity of the secondary battery 1.

Furthermore, the secondary battery 1 may be provided in plurality. In the case, the secondary batteries 1 may be connected in series or in parallel to constitute a battery module 10 and the bulletproof materials 4 may be provided to the battery module 10 to improve safety of the battery module 10.

The battery module 10 may be provided in the following forms: i) the bulletproof material 4 is not provided to the secondary batteries 1 included in the battery module 10, but is provided at the level of the battery module 10; ii) the bulletproof material 4 is provided to the secondary batteries 1 included in the battery module 10, but is not provided at the level of the battery module 10; and iii) the bulletproof material 4 is provided to the secondary batteries 1 included in the battery module 10, and is also provided at the level of the battery module 10.

When the bulletproof material 4 is provided at the level of the battery module 10, the bulletproof material 4 may be disposed on at least one of the inside of the battery module 10, an inner surface of a battery module exterior part 11, and the outermost surface of the battery module exterior part 11, but is not limited thereto.

Figure 2:
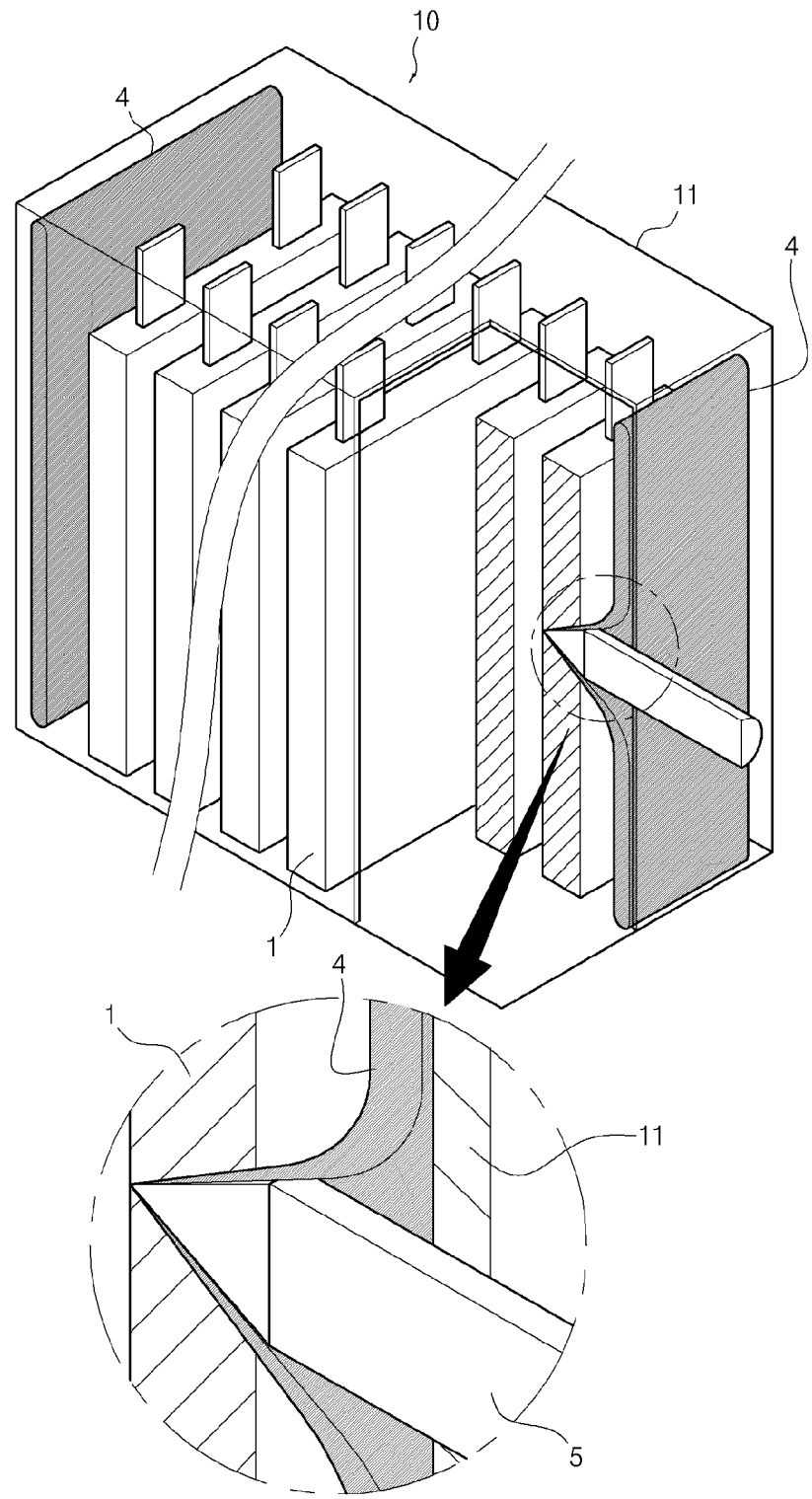
FIG. 2 is a schematic view illustrating a state in which a conductive needle-shaped member penetrates a battery module, according to an embodiment of the present invention.

FIG. 2 is a perspective view illustrating a battery module 10 including bulletproof materials 4 according to an embodiment of the present invention. The current embodiment is just an exemplary embodiment of the present invention, and does not limit the present invention. According to the current embodiment, the number of secondary batteries 1 and the number of the bulletproof materials 4 in the battery module 10 may vary with a purpose and a capacity of the battery module 10.

Furthermore, the battery module 10 may be provided in plurality to constitute a battery pack 20. In the case, at least one of the bulletproof materials 4 may be provided to the battery pack 20 to thereby improve safety of the battery pack 20.

The battery pack 20 may be provided in the following forms: i) the bulletproof material 4 is not provided to the battery modules 10 included in the battery pack 20, but is provided at the level of the battery pack 20; ii) the bulletproof material 4 is provided to the battery modules 10 included in the battery pack 20, but is not provided at the level of the battery pack 20; and iii) the bulletproof material 4 is provided to the battery modules 10 included in the battery pack 20, and is also provided at the level of the battery pack 20.

When the bulletproof material 4 is provided at the level of the battery pack 20, the bulletproof material 4 may be disposed on at least one of the inside of the battery pack 20, an inner surface of a battery pack exterior part 21, and the outermost surface of the battery pack exterior part 21, but is not limited thereto.

Figure 3:
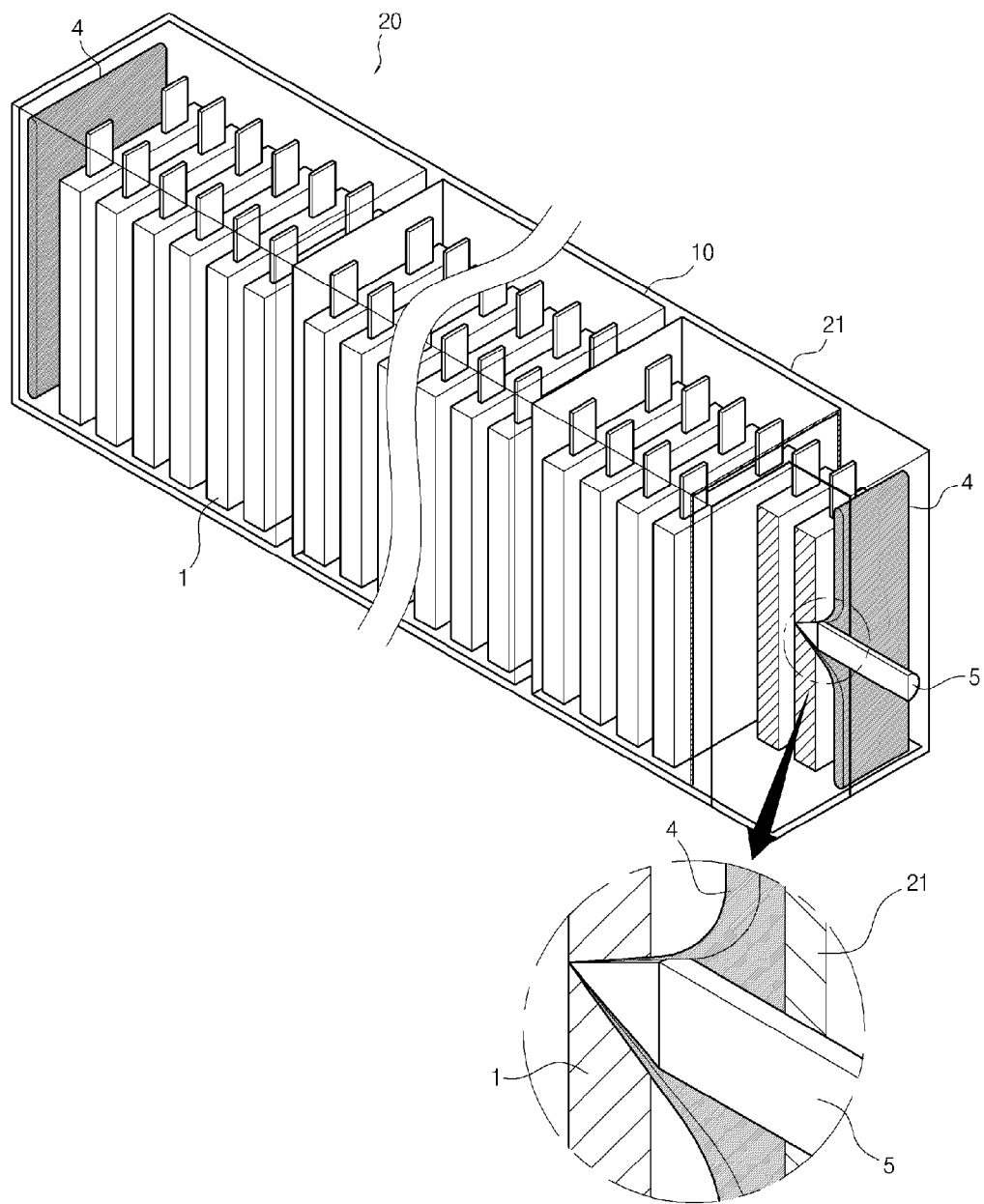
FIG. 3 is a schematic view illustrating a state in which a conductive needle-shaped member penetrates a battery pack, according to an embodiment of the present invention.

FIG. 3 is a perspective view illustrating a battery pack 20 including bulletproof materials 4 according to an embodiment of the present invention. The current embodiment is just an exemplary embodiment of the present invention, and does not limit the present invention. According to the current embodiment, the number of battery modules 10, the number of secondary batteries 1 and the number of the bulletproof materials 4 in the battery pack 20 may vary with a purpose and a capacity of the battery pack 20.

A battery pack including one or more bulletproof materials according to the present invention may be used as a power source for power tools; electric vehicles (EVs) including a hybrid electric vehicle (HEV) and a plug-in hybrid electric vehicle (PHEV); electric two-wheeled vehicles including an E-bike and an E-scooter; electric golf carts; electric trucks; and electric commercial vehicles.

The engine room of an electric vehicle is provided with a duct through which refrigerant flows to remove heat generated during driving of the electric vehicle, and the battery pack may be adjacent to the duct to remove heat generated from the battery pack.

In this case, the position of the bulletproof materials included in the battery pack may depend on the position of the duct.

Such a duct may be disposed at the upper or lower side of a medium-to-large battery pack, but is not limited thereto. For example, the duct may be designed to be disposed at the upper side of a medium-to-large battery pack according to the structure of a vehicle. Further, the duct may be designed to prevent the medium-to-large battery pack from being accidentally installed upside down on the vehicle.

When the duct is disposed at the upper side of the battery pack, the bulletproof materials may be disposed on an outer surface of an exterior part of the battery pack, or between the battery pack and the duct. Alternatively, referring to FIG. 4, a bulletproof material 4 may be disposed on the top surface of a duct 6 over a battery pack 20.

Figure 4:
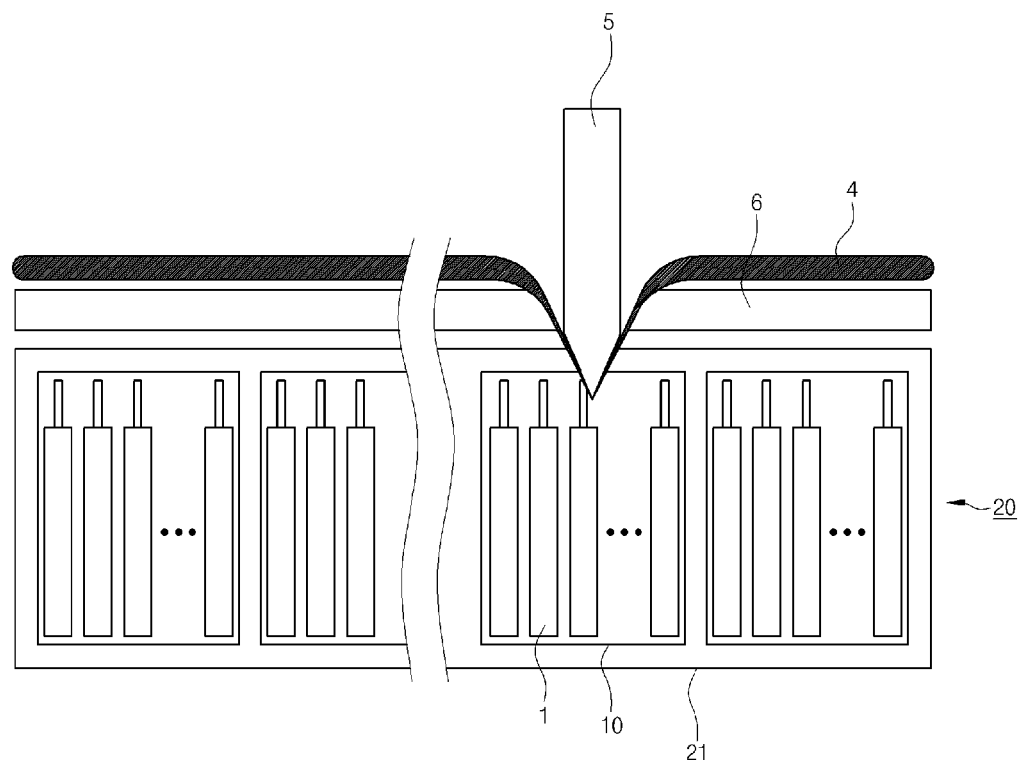
FIG. 4 is a schematic view illustrating a state in which a conductive needle-shaped member penetrates a battery pack adjacent to a duct, according to an embodiment of the present invention.

Particularly, as illustrated in FIG. 4, in the case where the bulletproof material 4 is disposed on the top surface of the duct 6 disposed over the battery pack 20, even when a conductive needle-shaped member 5 damages the engine room of a vehicle, the bulletproof material 4 primarily and physically protects the duct 6 as well as the battery pack 20 from the needle-shaped member 5.

The bulletproof material 4 improves safety of the battery pack 20, and is configured as described above.

Although a battery pack may be disposed in the engine room of an electric vehicle as described above, the position of a bulletproof material on a battery pack according to the present invention may vary with its purpose, and additional bulletproof materials may be disposed in various positions.

Hereinafter, a secondary battery according to the following examples will now be described in more detail, but the present invention is not limited thereto.

Example 1

A bulletproof material (trade name: Heracron HT640, manufactured by KOLON Industry) is used according to the current embodiment. Heracron HT640 has a tensile strength of about 2.0 GPa, and a pyrolysis temperature of about 550° C.

The bulletproof material has a thickness of about 20 mm and an area that is the same as that of an outermost large surface of a pouch in a secondary battery. The bulletproof material is adhered to the outermost large surface of the pouch with an adhesive.

Example 2

Heracron HT640 is prepared as a bulletproof material according to the current example, which has a thickness of about 50 mm and an area that is the same as that of an outermost large surface of an exterior part of a battery module including eight secondary batteries. The bulletproof material is adhered to the outermost large surface of the exterior part with an adhesive.

Example 3

Heracron HT640 is prepared as a bulletproof material according to the current example, which has a thickness of about 100 mm and an area that is the same as that of an outermost large surface of an exterior part of a battery pack including forty eight secondary batteries. The bulletproof material is adhered to the outermost large surface of the exterior part with an adhesive.

Comparative Example 1

A secondary battery without the bulletproof material according to the Example 1.

Comparative Example 2

A battery module without the bulletproof material according to the Example 2.

Comparative Example 3

A battery pack without the bulletproof material according to the Example 3.

Experimental Example: Safety Evaluation of Secondary Battery, Battery Module, and Battery Pack The secondary batteries, the battery modules, and the battery packs according to the examples and the comparative examples were fully charged with a voltage of about 4.2 V, then, their center and side surfaces were penetrated with a nail having a diameter ranging from about 2.5 mm to about 20 mm, and then, it was examined whether they were burned or not. The nail penetrated the secondary batteries, the battery modules, and the battery packs at a speed of about 12 m/min to evaluate their safety.

TABLE 1

| | | Safety Evaluation Conditions | Maximum Temperature | Short-circuiting | Burning |
|---|---|---|---|---|---|
| Ex. 1 (with penetrated surface) | Battery | Fully Charged with 4.2 V (5.3 Ah) Nail of 2.5 mm, 12 m/min | 50° C. | Delayed | None |
| Comparative Ex. 1 (with penetrated surface) | Battery | Fully Charged with 4.2 V (5.3 Ah) Nail of 2.5 mm, 12 m/min | 500° C. or higher | Short-circuiting | Burning |
| Ex. 2 (with penetrated surface) | Module | 8 Cells Fully Charged with 4.2 V (5.3 Ah) Nail of 2.5 mm, 12 m/min | 190° C. | Delayed | None |
| Comparative Ex. 2 (with penetrated surface) | Module | 8 Cells Fully Charged with 4.2 V (5.3 Ah) Nail of 2.5 mm, 12 m/min | 500° C. or higher | Short-circuiting | Burning |
| Ex. 3 (with penetrated side surface) | Pack | 48 Cells Fully Charged with 4.2 V (20 Ah) Nail of 20 mm, 12 m/min | 80° C. | Delayed | None |
| Comparative Ex. 3 (with penetrated side surface) | Pack | 48 Cells Fully Charged with 4.2 V (20 Ah) Nail of 20 mm, 12 m/min | 500° C. or higher | Short-circuiting | Burning |

According to the present invention, a secondary battery, a battery module, and a battery pack include a bulletproof material. Even when a conductive needle-shaped member penetrates the secondary battery, the battery module, or the battery pack, heating, burning, discharge of evaporated electrolyte and electrical contact between the needle-shaped member and an electrode can be prevented, thereby improving safety of the secondary battery, the battery module, and the battery pack.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A battery pack comprising:
   a plurality of battery modules, and
   at least one bulletproof material adhered to the outermost large surface of a battery pack pouch opposite to the surface in contact with another battery pack part, as a separate layer from the battery pack exterior part,
   wherein the bulletproof material comprises at least one selected from the group consisting of aramid fiber, ultra-high-molecular-weight polyethylene fiber (UHM-WPE fiber), and polybenzoxazole fiber (PBO fiber),
   wherein the bulletproof material has a thickness of 20 mm to 100 mm,
   wherein the battery pack is adjacent to a duct of an electric vehicle selected from the group consisting of an electric vehicle (EV), a hybrid electric vehicle (HEV) and a plug-in hybrid electric vehicle (PHEV) through which refrigerant flows,
   the battery pack or the duct is provided with the bulletproof material, and
   the duct is disposed between the battery pack and the bulletproof material.

2. The battery pack of claim 1, wherein the battery module comprises at least one of the bulletproof materials.

* * * * *